United States Patent

Gross et al.

[15] 3,665,426

[45] May 23, 1972

[54] ALTERABLE READ ONLY MEMORY ORGANIZATION

[72] Inventors: Robert D. Gross, North Caldwell; Roland T. Rogers, Wayne, both of N.J.

[73] Assignee: The Singer Company, New York, N.Y.

[22] Filed: Oct. 7, 1970

[21] Appl. No.: 78,731

[52] U.S. Cl. ....................340/173 SP, 340/173 R, 340/172.5

[51] Int. Cl. ....................................G11c 29/00, G11c 17/00

[58] Field of Search..........340/172.5, 173 R, 173 SP, 174 SP

[56] References Cited

UNITED STATES PATENTS

| | | | |
|---|---|---|---|
| 3,434,116 | 3/1969 | Anacker | 340/172.5 |
| 3,234,521 | 2/1966 | Weisbecker | 340/172.5 |
| 3,585,607 | 6/1971 | De Haan | 340/173 R |
| 3,245,049 | 4/1966 | Sakalay | 340/172.5 |
| 3,422,402 | 1/1969 | Sakalay | 340/172.5 |
| 3,588,830 | 1/1968 | Duda | 340/172.5 |
| 3,248,708 | 4/1966 | Haynes | 340/172.5 |
| 3,343,141 | 9/1967 | Hackl | 340/172.5 |
| 3,245,052 | 4/1966 | Lewin | 340/173 R |

*Primary Examiner*—Stanley M. Urynowicz, Jr.
*Attorney*—S. A. Giarratana and Thomas W. Kennedy

[57] ABSTRACT

An alterable read only memory organization is provided having a relatively inexpensive master read only memory which is capable of handling system data storage requirements. A smaller capacity, easily alterable, read only memory is used to store changed system data. A digital comparator compares the address of words stored in the master memory with the address of changed words in the alterable memory and controls a gating arrangement which selects the output of the alterable memory and inhibits the output of the master memory when the addresses are the same and selects the master memory output and inhibits the alterable memory output when the addresses are different.

8 Claims, 3 Drawing Figures

INVENTORS.
ROBERT D. GROSS
ROLAND T. ROGERS

BY
S. A. Giannattasio
Thomas W. Kennedy
ATTORNEY

INVENTORS
ROBERT D. GROSS
ROLAND T. ROGERS
BY
ATTORNEY

ALTERABLE READ ONLY MEMORY ORGANIZATION

BACKGROUND OF THE INVENTION

1. Field of the Invention

This invention relates generally to information storage or "-memory" arrangements for data processing systems and the like and more particularly to an alterable read only memory organization therefor.

2. Description of the Prior Art

Modern data processing systems usually require several types of information storage or "memory" arrangements. The type of memory employed in a given system usually depends upon the amount of information to be stored, the required speed of recall or "read out," and the alterability required for the stored information. When the stored information is to be read out repeatedly by the data processing system over long periods of time, the memory unit employed is usually of the non-destruct read only or "NDRO" type which permits repeated access to the stored data without altering or destroying it. An example of this type of memory arrangement would be a semiconductor memory, which is essentially a diode matrix wherein the stored binary digital information or bits are represented by the presence or absence of a semiconductor or diode in the matrix. Because of the nature of the device, data stored in such matrices cannot be easily altered or rewritten without physically altering the memory unit by the addition of replacement modules or the physical insertion or deletion of individual diodes.

Although the data stored in such NDRO memory units is intended to be relatively permanent, it is often desired to alter the stored data or add new data by electrical means which do not require the physical alteration of the memory unit. To accomplish this, several types of electrically alterable NDRO memories have been developed which usually take the form of a multi-aperture magnetic core device or a so called "plated wire" memory. The data stored in these devices are written in electrically and may be read out without destroying the stored data. Additionally, the information stored in these devices may be altered by changing the magnetic state of the device through electrical energization of write wires or windings. Unfortunately, the cost of electrically alterable NDRO memories is rather expensive and consequently renders their use impractical for many small and intermediate size data processing systems. Additionally, when the percentage of the stored data to be altered is small in comparison to the overall data storage capacity or when the stored information is altered only infrequently, the use of such electrically alterable NDRO memories in data processing systems may constitute an "over design" which does not produce an optimum system for the least cost.

Many data processing systems in operation at the present time present situations wherein the data pattern that will be written into the NDRO is fairly well known and wherein any alterations in the stored data which will be made will be only some percentage of the required total memory capacity. Additionally, in such systems the alterations of the stored data will occur only infrequently. It is usually required, however, that the memory organization be flexible enough to permit changes in the data storage which will be random in nature and may occur at any location in the memory. Finally, it is extremely desirable that changes or alterability of the stored data be made in the least possible time to minimize system "-downtime" and to retrofit cycle. An alterable read only memory for such data processing systems must meet the foregoing requirements and must also be available for use at a cost substantially below the cost of presently available electrically alterable memory systems.

SUMMARY OF THE INVENTION

It is an object of this invention to provide an alterable read only memory organization which is relatively low in cost and which is suitable for use with many types of modern data processing systems requiring a readily alterable read only memory.

It is a further object of this invention to provide an alterable read only memory organization in which changes to the stored data can be random in nature and may occur at any location in the memory.

It is a still further object of this invention to provide an alterable read only memory organization which may utilize relatively low cost, commercially available, read only memory units as components thereof and which possesses the data alteration capabilities of more expensive alterable read only memory arrangements, such as electrically alterable units, for example.

It is an additional object of this invention to provide an alterable read only memory organization which is suitable for use with either sequential or random access addressing means.

Briefly, the alterable read only memory organization of the invention contemplates the use of a master read only memory unit to provide the data storage capacity required for the system in which the memory organization is to be employed. The master memory unit may comprise a relatively inexpensive memory, which is usually not readily altered, to store the system data. A smaller capacity, read only memory unit, which is readily alterable, is employed to store the altered or changed system data in an altered system data section thereof and the address data for such altered system data in an address data section thereof. Address means are provided to address the master memory unit and both sections of the alterable memory unit to read out the data stored therein. Data select means comprising address comparator means and selectively operable switch means are utilized to select the data read out from the altered system data section of the alterable memory unit and inhibit the data read out from the master memory unit whenever the data read out from the master memory unit is from an address for which altered data is stored in the alterable memory unit. When the data read out from the master memory unit is not from an address for which altered system data is stored in the alterable memory unit, the output of the master memory is selected and the output from the alterable memory is inhibited. By virtue of this arrangement, the smaller capacity, easily alterable memory unit cooperates with the relatively inexpensive master memory unit to provide a memory organization having excellent data alteration capabilities. The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
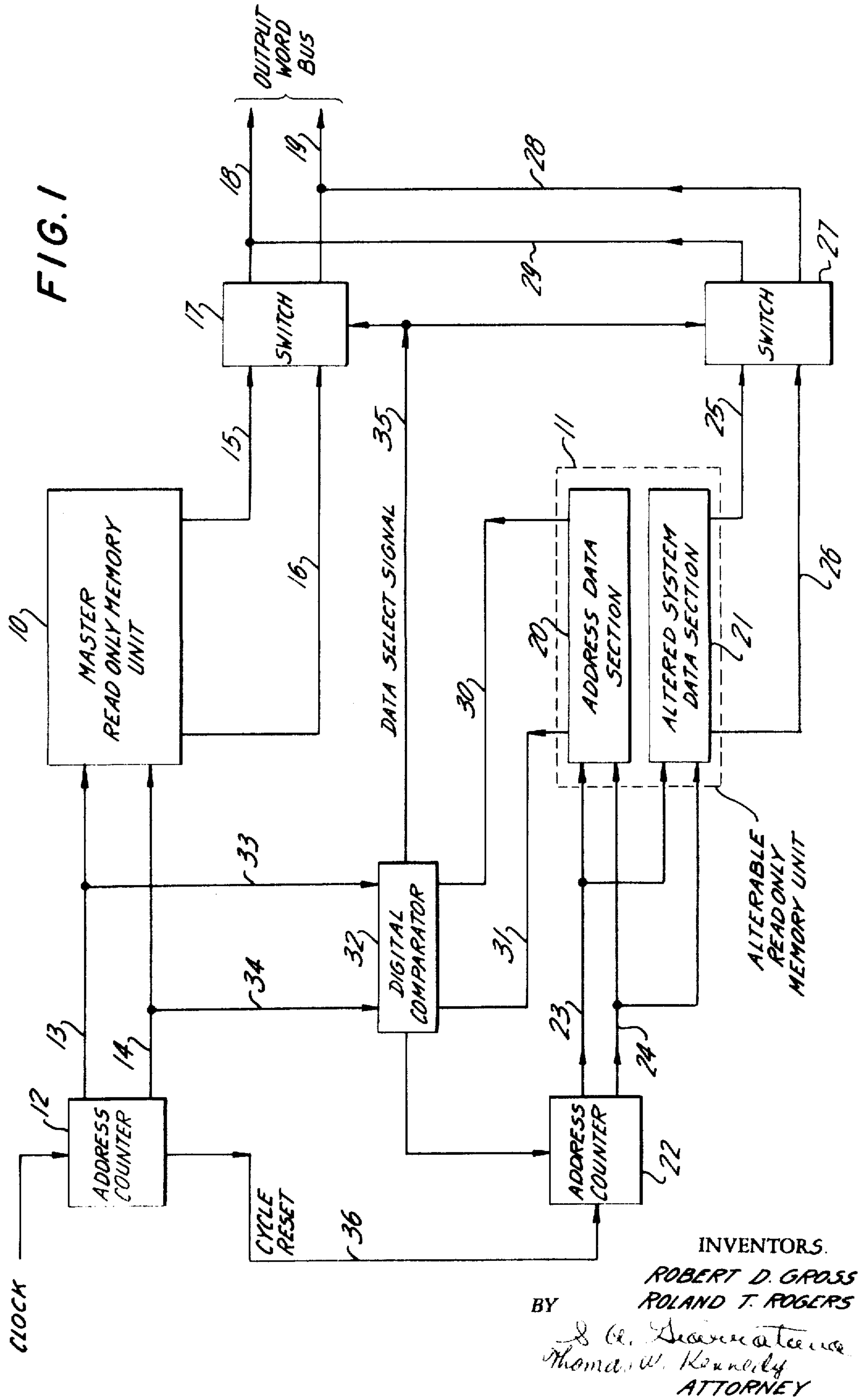
FIG. 1 is a schematic diagram of an alterable read only memory organization constructed in accordance with the teachings of the present invention.

Referring now to FIG. 1 of the drawings, an alterable read only memory organization constructed in accordance with the teachings of the present invention is shown as comprising a master read only memory unit 10 and an alterable read only memory unit 11. The master read only memory unit 10 is intended to provide permanent storage of data for the data processing system in which the unit is employed. To this end, it is designed to have a data storage capacity sufficiently large to meet the requirements of the data processing system. Since the system data to be stored in the master memory unit will be repeatedly read out during the course of the data processing operation, the memory unit 10 may comprise a relatively low cost, NDRO memory unit of any suitable type. For example, the unit 10 may comprise a semiconductor memory in which the storage of bits is represented by the presence or absence of a diode in a matrix. Units of this type are commercially available and are capable of storing a substantial volume of data at a reasonable cost. Since the master memory unit provides relatively permanent storage of data rather than transient storage, the memory unit 10 is usually not capable of rapid, low cost data alteration. In the case of a semiconductor type of master memory unit, the stored data can only be altered by physically altering the memory unit. For convenience, many units of this type are fabricated in small modular sections which may be removed and replaced by new modular sections. It is apparent, however, that the removal of a modular section or module and its replacement by a new module containing altered system data would be a time-consuming operation, since the new module must be specially fabricated to provide the new data required for the system. Additionally, since a module generally provides storage for a substantial number of system "words," it would not be economical to replace a module whenever a relatively small number of stored words are to be changed.

The master memory unit 10 is provided with an address counter 12 which causes the memory unit to read out the data stored therein. In the arrangement shown in FIG. 1 of the drawings, the address counter 12 is activated by a series of clock pulses from any convenient source (not shown) so that the counter sequentially provides a series of address words at the outputs 13 and 14 thereof. The counter 12 may comprise, for example, any of the well-known binary counter circuits which are capable of providing a digital address for the particular type of master memory unit employed. In the arrangement illustrated, the address counter 12 is driven by a series of clock pulses so that a sequential addressing operation is produced at the counter outputs 13 and 14, thereby causing the master memory unit to be sequentially addressed at each of its addresses during a complete cycle of counter operation. Although, for convenience of illustration, the output of the address counter 12 is shown as comprising only outputs 13 and 14, or a two bit address word, it is understood that the counter output will have a number of bits per address word equal to the number of bits defining each address in the master memory unit 10. For example, if the master memory unit has a 2,048 word storage capacity or 2,048 addresses, each consisting of 16 bits, the address counter 12 would produce in sequential order 2,048 addresses during each complete cycle of counter operation and each of the addresses so produced would consist of 11 bits. The sequential address output of address counter 12 causes the master memory unit 10 to read out in sequence all of the 2,048 words stored therein at the output 15, 16 of the memory unit. Again, for convenience of illustration, the output from the master memory unit is shown as consisting of only two outputs 15 and 16, although it will be understood that for a 16 bit word the output would consist of 16 leads. The output 15, 16 of the master memory unit is coupled through a switch arrangement 17 to the memory organization output 18, 19 which constitutes the output word bus for the memory organization.

The alterable read only memory unit 11 is composed of two sections, namely, an address data section 20 and an altered system data section 21. Address data section 20 is provided for the storage of the address for which altered or corrected system data are stored in the altered system data section 21. The addresses written into address data section 20 are in the same form as the addresses produced at the output 13, 14 of the address counter 12, so that if a 16 bit address word output is produced by the address counter 12, a 16 bit address word would be stored in the section 20 of the alterable memory unit 11. The altered system data which is to be substituted for the system data stored at a particular address in the master memory unit 10 is stored in the altered system data section 21. Accordingly, if each of the words stored in master memory unit 10 consists of 16 bits, the altered system data section 21 should be capable of storing a plurality of 16 bit words. The capacity of the altered system data section is largely dependent upon the number of words stored in the master memory unit 10 which can be expected to be altered or changed during predetermined operating period. In practice, the capacity of the altered system data section 21 will usually be a small fraction of the data storage capacity of the master memory unit 10. If the need for alterations and corrections of the data stored in the master memory unit in a particular system increases to the point where the amount of data to be altered comprises a substantially high percentage of the capacity of the unit, a point is reached where it would usually be more economical to substitute an alterable read only memory unit for the master memory unit, so that all of the data stored in the unit can be rapidly corrected. When the word storage capacity of the altered system data section 21 is determined, the storage capacity of the address data section 20 is usually made the same, since there will usually be only one address word in the address section 20 for each word stored in the data section 21.

The alterable read only memory unit 11 may conveniently comprise any one of a number of commercially available, alterable read only memory units which are readily alterable to permit the writing in of new system data. For example, the alterable read only memory unit could comprise a unit of the multi-aperture magnetic core type. In the aforementioned magnetic core type of memory, the new or corrected system data is written into the memory by electrical means, such as the energization of write wires, for example, and consequently, the change in stored system data can be easily and quickly accomplished with a minimum of downtime for the data processing system in which the memory is employed. It will be understood, however, that the alterable read only memory unit 11 may comprise types of memory arrangements which are not electrically alterable but which are, nevertheless, more easily altered than the master memory unit 10. The choice of the type of alterable read only memory employed for the unit 11 again depends largely upon the application to which the memory organization is to be put and the extent and frequency of the anticipated changes to stored system data.

An address counter 22 having an output at 23, 24 is arranged to simultaneously address both sections 20 and 21 of the alterable memory unit 11. The address counter 22 may, for example, comprise a cyclic binary counter similar in construction to the address counter 12 but having a smaller operating cycle because of the smaller number of addresses to be transmitted to the alterable memory unit 11. As the address counter 22 addresses the altered system data section 21, the words stored in the section appear at the output 25, 26 of the section and are coupled by means of a switch arrangement 27 and leads 28 and 29 to the output word bus 18, 19 of the memory organization. The switch means 17 and 27 are selectively operable and serve to connect either the output of master memory unit 10 or the output of the altered system data section 21 of the alterable memory unit 11 to the output word bus, for reasons which will hereinafter be explained. The output of address data section 20 appearing at 30, 31 is coupled directly to one input of a digital comparator 32. Again, for convenience of illustration, the read outputs of the sections 20 and 21 of the alterable memory unit 11 are shown as having only two bits or output leads although it will be understood that the outputs of each will contain the number of bits comprising the particular word stored in each section. In the example previously given, the output of the address data section 20 would have 11 bits and the output of the altered data section 21 would have 16 bits. The second input of the digital comparator 32 is coupled by leads 33 and 34 to the output of address counter 12 so that the comparator is responsive to both the address word command given to the master memory unit 10 and the address word read out of section 20 of the alterable memory unit 11.

Figure 2:
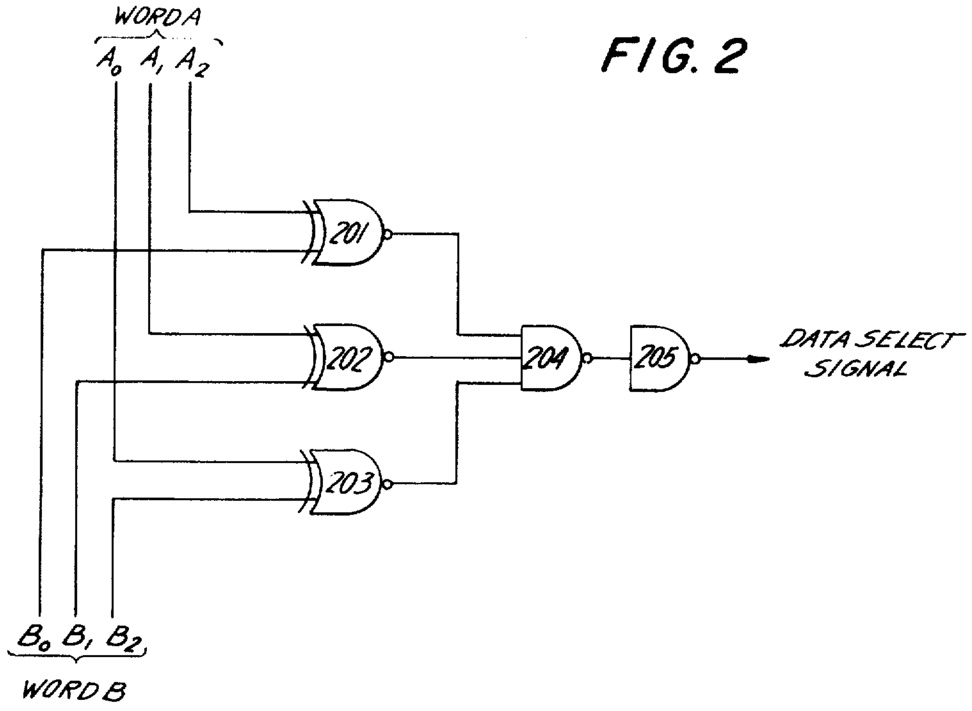
FIG. 2 is a logic circuit diagram of a digital comparator suitable for use in the alterable read only memory organization of FIG. 1.

The digital comparator 32 essentially functions to compare each bit of the address word produced by counter 12 with each bit of the address word read out of section 20 of the alterable memory unit 11 and to produce a logical output or data select signal at lead 35 whenever the two address words being compared are identical. A logical circuit arrangement suitable for use as the digital comparator 32 is shown in FIG. 2 of the drawings as comprising gates 201, 202, 203, 204, and 205. Gates 201, 202 and 203 are shown as comprising two input, exclusive NOR gates which will produce a high or logical "1" output only when both inputs are high or when both inputs are low. If either of the inputs to a particular gate is low, the output from the gate will be low. For example, when the digital comparator is employed to compare a word A consisting of bits $A_0$, $A_1$, and $A_2$ and a word B consisting of bits $B_0$, $B_1$ and $B_2$, the two inputs of gate 201 are respectively connected to bits $A_2$ and $B_0$, the inputs of gate 202 are connected to bits $A_1$ and $B_1$, and the inputs of gate 203 are connected to bits $A_0$ and $B_2$, so that each gate compares a corresponding bit of each address word. The output of each of gates 201, 202 and 203 are connected to a different input of a three-input, NAND gate 204 which functions to produce a logical low or "0" at its output whenever all of the three inputs to the gate are high. The output from the gate 204 will be high whenever any one or all of the three inputs is low. The output of gate 204 is applied through an inverter gate 205 to provide a logical high or "1" signal whenever the address word A is identical to the address word B. When the address word A is not identical to the address word B, the output of gate 205 will be a logical "0."

The data select signal appearing at the output of the digital comparator 32 is employed to control the switch means 17 and 27 which function to selectively connect the output of either memory unit 10 or the output of memory unit 11 to the output word bus of the memory organization. The switch means 17 and 27 are arranged to be mutually exclusive in operation, so that at any given time the output of only one of the memory units is connected to the output word bus. When the data select signal is low, indicating that the address word read out of section 20 of memory unit 11 is different than the address word produced by address counter 12, switch 17 is closed and functions to transfer the data being read out of memory unit 10 to the output word bus while switch 27 is open to prevent the data being read out from data section 21 of the memory unit 11 from reaching the output word bus. When the data select signal is logically high, indicating that the address word produced by address counter 12 is identical to the address word being read out of section 20 of the memory unit 11, the output from the altered system data section 21 of the memory unit 11 is selected and is connected to the output word bus and the output from the master memory unit 10 is inhibited and therefore disconnected from the output word bus.

Figure 3:
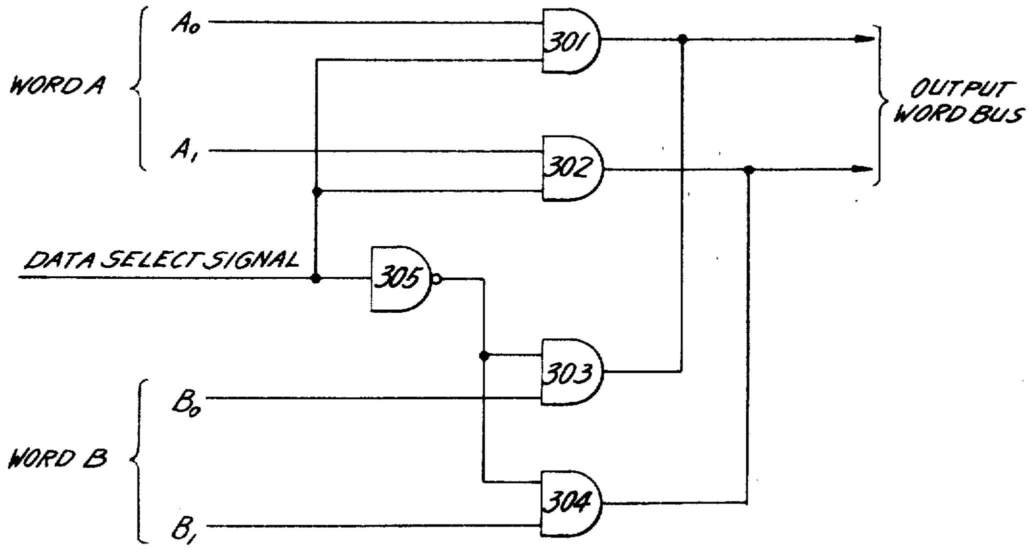
FIG. 3 is a logic circuit diagram of a data transfer or switching circuit suitable for use with the alterable read only memory organization of FIG. 1.

A logical circuit arrangement suitable for the switches 17 and 27 is shown in FIG. 3 of the drawings as comprising gates 301 through 305. Gates 301 through 304 may conveniently comprise two input, AND or NAND gates which are enabled or inhibited by the application of a logical signal from data select line 35. For example, one input of gate 301 is arranged to receive a bit $A_0$ of word A while one input of gate 302 is arranged to receive bit $A_1$ of the same word. The other input of each of the gates 301 and 302 is connected to a data select signal, so that these gates are operative to pass the bits $A_0$ and $A_1$ of word A to the output word bus only when the data select signal is logical "1" or high. When the data select signal is low, the word A is prevented from reaching the output word bus. The gates 303 and 304 are arranged to have one input of each gate connected to the data select line through an inverter gate 305 which converts a logical high signal to a logical low signal. One input of gate 303 is connected to bit $B_0$ of a word B, while one input of gate 304 is connected to bit $B_1$ of the same word. By virtue of this arrangement, when the data select signal is logically high, a logical low signal appears at the output of inverter 305 to inhibit the operation of gates 303 and 304, to thereby prevent the word B from reaching the output word bus. Similarly, when the data select signal is a logical low, the inverter 305 causes a logical high signal to be applied to one input of each of the gates 303 and 304, to thereby pass the word B to the output word bus. Accordingly, the operation of the gates is mutually exclusive and functions to connect either word A or word B to the output word bus depending on the logical state of the data select signal.

Referring again to FIG. 1 of the drawings, it is seen that the output of the digital comparator 32 is also applied to the trigger input of the address counter 22, so that when the digital comparator compares identical address words, the data select signal produced acts to trigger the address counter to produce the next sequential address. Accordingly, the address counter 22 will sequentially address the alterable memory unit 11 as the data select signal from the digital comparator 32 switches from a logical high to a logical low and back again. The cycle reset output of address counter 12 may be coupled by a lead 36 to the reset input of address counter 22, so that whenever address counter 12 reaches the end of its counting cycle and is reset, the address counter 22 is similarly advanced to the beginning of its counting cycle.

In operation, whenever a word stored in master memory unit 10 is to be altered or corrected, the altered or corrected word is written into altered system data section 21 of the alterable read only memory unit. The address which the word to be corrected has in the master memory unit 10 is then written into address data section 20 of the memory unit 11, so that as the address counter 12 sequentially addresses the master memory unit 10 it will reach the address of the word to be corrected and the digital comparator 32 will note the identical address words produced by the address counter 12 and the address data section 20 and will inhibit the output from master memory unit 10 and will select the output from the altered system data section 21 of the memory unit 11 to thereby place the altered or corrected word on the output word bus. Whenever the digital comparator 32 does not find the bits of the address word from counter 12 identical to the bits of the address word read out from address data section 20, the data select signal becomes a logical low and prevents the output word from the alterable memory unit 11 from reaching the output word bus but permits the word read out from master memory unit 10 to reach the output of the memory organization. When the output of the digital comparator 32 goes from a logical low to a logical high, thereby indicating that the address of a word stored in the alterable memory unit 11 corresponds to the address of a word in the master memory unit, the address counter 22 is triggered to provide the next address word for the alterable memory unit, so that the address word for the next altered word is ready for comparison with the corresponding address word produced by the address counter 12. For example, if a word stored at address 3 in the master memory unit 10 is to be altered, address 3 is written into a first location in the address data section 20 of the alterable memory unit 11 and the altered or corrected word for that address is written into the altered system data section 21. If a word located at address 598 in the master memory unit 10 is also to be altered the address word 598 is written into a second location in the address data section 20 and the altered word for that address is written into the altered system data section 21. As the address counter 12 starts to sequentially count from 1 through the end of its cycle, the words stored in the master memory unit 10 are read out to the output word bus, since the data select signal is a logical low. When the address counter 12 reaches address 3, the digital comparator 32 notes that address word 3 stored in address data section 20 is the same as the address word 3 produced by the address counter 12 and the data select signal goes from a logical low to a logical high. Since address counter 22 is causing the altered system data section 21 to read out the altered or corrected word for address 3 at this time, the selectively operable switch means 17 and 27 connect the corrected or altered word to the output word bus and prevent the original word stored in the master memory unit from reaching the memory organization output. Since the data select signal is a logical high, the address counter 22 is triggered to cause it to produce its next address, so that the address data section 20 now reads out the address word 598 which is stored at the second location therein. Accordingly, when address counter 12 reaches address word 598, the digital comparator 32 will once more sense that the address word stored in the data section 20 is identical to the address word produced by address counter 12, so that the correct or altered word stored in the section 21 of the alterable memory unit is passed to the output word bus and the original word stored at that address in the master memory unit 10 is prevented from reaching the memory organization output. When the address counter 12 finishes its counting cycle, it will reset the address counter 22 to the beginning of the counting cycle for that counter.

By virtue of the foregoing arrangement, it is seen that a relatively inexpensive master read only memory unit may be employed for the memory organization since the master memory unit itself need not be altered each time a change in stored system data is desired. The use of the alterable memory unit 11, which may be easily and quickly altered to include changes or alterations in stored system data, permits the necessary changes or alterations to be written into the overall memory organization. As previously explained, in many data processing applications, the data pattern that will be written into the system is fairly well known and any changes that are made will be only a relatively small percentage of the total memory capacity. Additionally, in many data processing systems the changes in stored data will occur only infrequently and may be random in nature and occur at any location in the memory. When these conditions are present, the alterable memory unit may have a storage capacity which is only a fraction of the storage capacity of the master memory unit for the system, so that the number of words stored in the relatively more expensive alterable memory unit 11 is only a small part of the overall system storage capacity. It should also be pointed out that when the alterable memory unit 11 of the memory organization of the invention is filled to capacity with altered system data, a new module containing the altered system data may be ordered and placed into the master memory unit 10, so that the alterable memory unit may be cleared and ready for the storage of new data alterations. Accordingly, the useful life of the memory organization is greatly increased and operating costs and system downtime greatly decreased.

It is believed apparent that many changes could be made in the construction and described uses of the foregoing alterable read only memory organization and many seemingly different embodiments of the invention could be constructed without departing from the scope thereof. For example, the sequential addressing arrangement shown in the disclosed embodiment of the invention could be replaced by a random access type of addressing system. Similarly, it will be understood that the types of memory employed in the master memory unit and the alterable memory unit could be varied depending upon the nature of the requirements of the data processing system in which the memory organization is employed. Finally, it is apparent that the logical circuit arrangements for the various components of the disclosed memory organization could be changed in accordance with known logic techniques without departing from the scope of the invention. Accordingly, it is intended that all matter contained in the above description or shown in the accompanying drawings shall be interpreted as illustrative and not in a limiting sense.

What is claimed is:

1. An alterable read only memory organization for data processing systems and the like comprising

- a master read only memory unit having a plurality of addresses for permanent storage of system data;
- an alterable read only memory unit for storage of altered system data, said alterable memory unit having a smaller number of addresses than said master memory unit;
- address means coupled to both of said memory units for causing said memory units to read out the data stored therein; and
- data select means coupled to each of said memory units for selecting the data read out from said alterable memory unit and inhibiting the data read out from said master memory unit whenever the data read out from said master memory unit is from an address for which altered data is stored in said alterable memory unit and for selecting the data read out from said master memory unit and inhibiting the data read out from said alterable memory unit whenever the data read out from said master memory unit is from an address for which no data is stored in said alterable memory unit, wherein said data select means comprises a selectively operable first portion coupled between the output of each of said memory units and the output of said memory organization, and a second portion coupled to said first portion for control thereof.

2. An alterable read only memory organization for data processing systems and the like comprising

- a master read only memory unit having a plurality of addresses for permanent storage of system data;
- an alterable read only memory unit for storage of altered system data, said alterable memory unit having a smaller number of addresses than said master memory unit;
- address means coupled to both of said memory units for causing said memory units to read out the data stored therein; and
- data select means coupled to each of said memory units for selecting the data read out from said alterable memory unit and inhibiting the data read out from said master memory unit whenever the data read out from said master memory unit is from an address for which altered data is stored in said alterable memory unit and for selecting the data read out from said master memory unit and inhibiting the data read out from said alterable memory unit whenever the data read out from said master memory unit is from an address for which no data is stored in said alterable memory unit, wherein said data select means comprises
- selectively operable switch means coupled between the output of each of said memory units and the output of said memory organization, and
- address comparator means coupled to said switch means for control thereof, said address comparator means being operable to control said switch means in response to the presence or absence of a difference between the address of data read out of said master memory unit and the address of data read out of said alterable memory unit, so that when such difference is present the data appearing at the output of the memory organization is the data read out from said master memory unit and when such difference is not present the data at the output of the memory organization is the data read out from said alterable memory unit.

3. An alterable read only memory organization as claimed in claim 2, wherein said alterable read only memory unit has a first section for storage of said altered system data and a second section for storage of the address data for such altered system data and wherein the addresses compared by said address comparator means are the addresses applied to said master memory unit and the addresses stored in said second section of the alterable memory unit.

4. An alterable read only memory organization as claimed in claim 3, wherein said address means comprises a first address counter coupled to said master memory unit for sequentially addressing said master memory unit and a second address counter coupled to both sections of said alterable memory unit for simultaneously addressing both of said sections.

5. An alterable read only memory organization as claimed in claim 4, wherein said address comparator means comprises a digital comparator having one input thereof coupled to the output of said first address counter, the other input thereof coupled to the output of said second section of said alterable memory unit, and the output thereof coupled to said second address counter and said selectively operable switch means, so that said second address counter is sequentially triggered to the next address whenever the altered system data stored in said alterable memory unit appears at the output of the memory organization.

6. An alterable read only memory organization as claimed in claim 5, wherein the sequential operating cycle of said second address counter is reset by the cyclic reset output of said first address counter.

7. An alterable read only memory organization as claimed in claim 6, wherein said alterable read only memory unit is an electrically alterable read only memory unit.

8. An alterable read only memory organization as claimed in claim 7, wherein said master read only memory unit comprises a plurality of replaceable read only memory modules, so that said alterable read only memory unit can be cleared of stored data when full and the altered system data stored therein transferred to one or more replacement modules for said master memory unit.

* * * * *